United States Patent
Teo et al.

(10) Patent No.: US 12,466,427 B2
(45) Date of Patent: Nov. 11, 2025

(54) CURB-BASED FEATURE EXTRACTION FOR LOCALIZATION AND LANE DETECTION USING RADAR

(71) Applicant: Motional AD LLC, Boston, MA (US)

(72) Inventors: Kiat Choon Teo, Singapore (SG); Sankara Mangaiahgari, Singapore (SG)

(73) Assignee: Motional AD LLC, Boston, MA (US)

( * ) Notice: Subject to any disclaimer, the term of this patent is extended or adjusted under 35 U.S.C. 154(b) by 217 days.

(21) Appl. No.: 17/669,079

(22) Filed: Feb. 10, 2022

(65) Prior Publication Data
US 2023/0303113 A1  Sep. 28, 2023

(51) Int. Cl.
*B60W 60/00* (2020.01)
*B60W 40/10* (2012.01)
*G06N 20/00* (2019.01)

(52) U.S. Cl.
CPC .......... *B60W 60/001* (2020.02); *B60W 40/10* (2013.01); *G06N 20/00* (2019.01); *B60W 2420/408* (2024.01); *B60W 2552/53* (2020.02); *B60W 2554/20* (2020.02); *B60W 2554/4041* (2020.02)

(58) Field of Classification Search
CPC ............... B60W 60/001; B60W 40/10; B60W 2554/20; B60W 2554/4041; B60W 2552/53; B60W 2420/52; G06N 20/00
See application file for complete search history.

(56) References Cited

U.S. PATENT DOCUMENTS

| 6,081,187 | A | 6/2000 | Akutsu | |
| 7,995,055 | B1 * | 8/2011 | Ma | G06V 10/761 |
| | | | | 382/154 |
| 9,285,230 | B1 * | 3/2016 | Silver | G01S 13/86 |
| 10,612,199 | B2 | 4/2020 | Pratt et al. | |

(Continued)

FOREIGN PATENT DOCUMENTS

| CN | 105667518 A | 6/2016 |
| CN | 105667518 B * | 7/2018 |

(Continued)

OTHER PUBLICATIONS

CN105667518B machine translation.*
Hata, A. Y. et al., "Robust curb detection and vehicle localization in urban environments", 2014 IEEE Intelligent Vehicles Symposium Proceedings, Jun. 2014, pp. 1257-1262. URL: doi: 10.1109/IVS.2014.6856405.

(Continued)

*Primary Examiner* — Todd Melton
*Assistant Examiner* — Oliver Tan
(74) *Attorney, Agent, or Firm* — Knobbe, Martens, Olson & Bear, LLP

(57) ABSTRACT

Provided are methods, systems, and computer program products for lane keep tracking and/or localization of a vehicle using a radar to detect metallic particles in paint applied to lane markings or curb markings. An example method may include: causing a radar system of a vehicle to output radio waves; receiving a radar image from the radar system corresponding to returned radio waves; determining a portion of the radar image includes lane or curb markings, wherein the lane or curb markings are embedded with metallic particles; and determining a location of the vehicle based at least in part on the determined portion of the radar image that includes the lane or curb markings.

20 Claims, 11 Drawing Sheets

(56) References Cited

U.S. PATENT DOCUMENTS

| | | | |
|---|---|---|---|
| 2014/0111369 A1* | 4/2014 | Oh | G06V 20/588 342/52 |
| 2015/0247297 A1 | 9/2015 | Protzmann et al. | |
| 2016/0171893 A1* | 6/2016 | Chen | G08G 1/0112 701/300 |
| 2017/0032678 A1* | 2/2017 | Sim | B60W 10/30 |
| 2018/0328741 A1* | 11/2018 | Pratt | G06V 20/588 |
| 2018/0330174 A1 | 11/2018 | Pratt et al. | |
| 2019/0250269 A1* | 8/2019 | Miu | G05D 1/021 |
| 2019/0369212 A1* | 12/2019 | Dylewski | G01S 17/93 |
| 2021/0108926 A1* | 4/2021 | Tran | G06T 17/05 |

FOREIGN PATENT DOCUMENTS

| | | |
|---|---|---|
| DE | 10 2019 201 088 A1 | 7/2020 |
| EP | 3379289 A1 | 9/2018 |
| WO | WO 2019/148000 A1 | 8/2019 |

OTHER PUBLICATIONS

Javanmardi, E. et al., "Autonomous vehicle self-localization based on abstract map and multi-channel LIDAR in urban area", IATSS Research, 2019 (available online May 2018), vol. 43, pp. 1-13.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Zhang, Y. et al., "Real-time localization method for autonomous vehicle using 3D Lidar", Conference: The 25th International Symposium on Dynamics of Vehicles on Roads and Tracks (IAVSD), Aug. 2017, in 6 pages.

Great Britain Office Action issued for Application No. GB 2218162.2, dated May 31, 2023.

Korean Office Action issued for Application No. KR 10-2022-0170890, dated Dec. 16, 2024.

Office Action received for KR Application No. 10-2022-0170890, mailed Sep. 18, 2025.

* cited by examiner

CURB-BASED FEATURE EXTRACTION FOR LOCALIZATION AND LANE DETECTION USING RADAR

DETAILED DESCRIPTION

Figure 1:
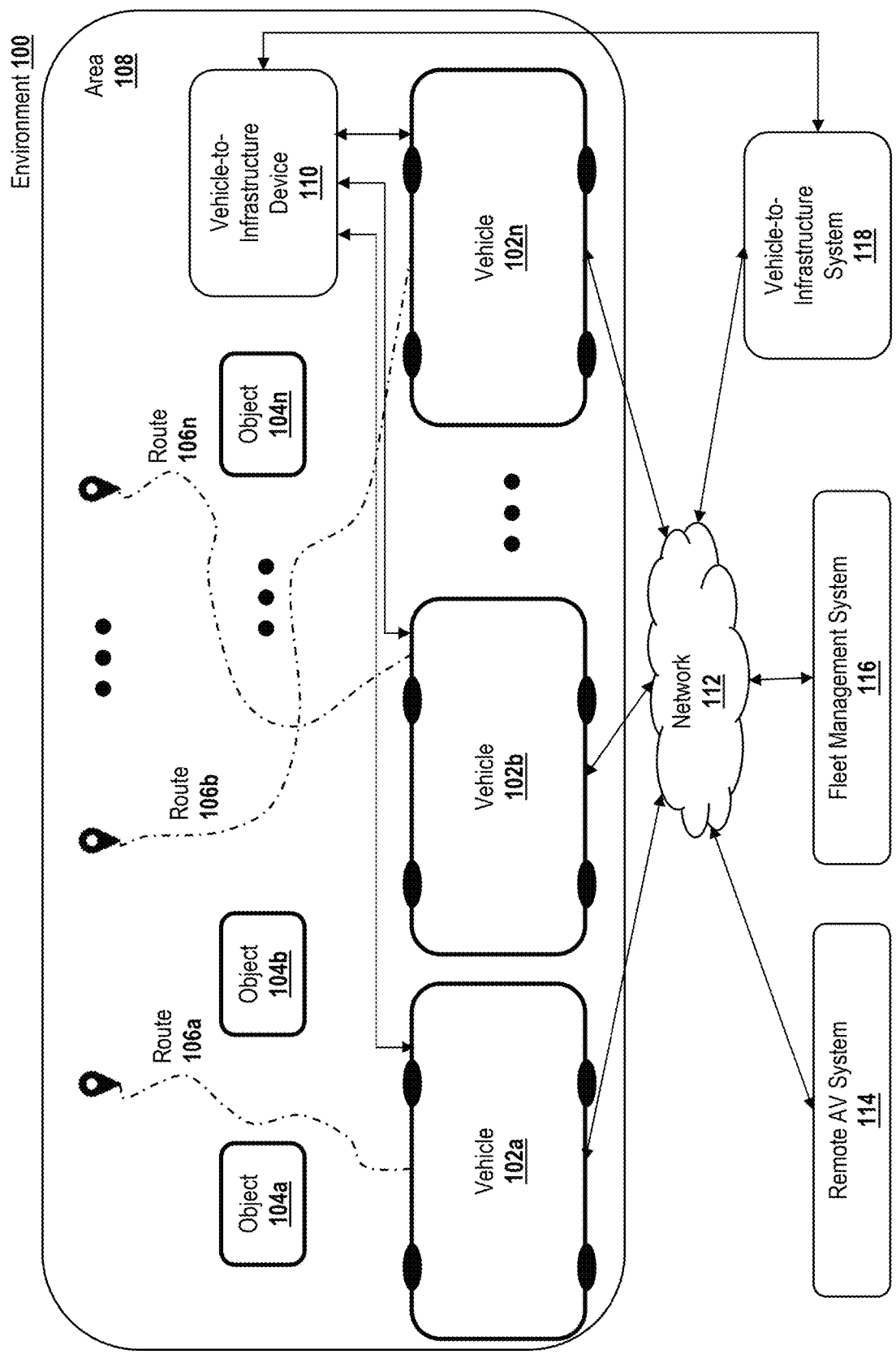
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event],"

and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

Some vehicles may perform lane keep tracking and/or localization to ensure safe operation of a vehicle. For instance, lane keeping assist (LKA) systems in autonomous vehicles can include lane detection functionality. By accurately detecting lanes, especially when there is an unintended lane change or drifting of a fast-moving vehicle (e.g., with a speed of 10 m/s or more) accidents can be avoided and/or mitigated. Moreover, precise and robust localization is a significant task for autonomous vehicles in complex scenarios. Accurate position determination can improve an autonomous vehicle's decision making and path planning.

In some aspects, systems, methods, and computer program products described herein include and/or implement a localization system. As a non-limiting example, the localization system can determine a vehicle's location using a radar to detect metallic particles in lane markings and/or curb markings. In some cases, the metallic particles may be embedded in paint used to make the lane and/or curb markings. In this way, the localization system can improve localization of the vehicle, thereby assisting planning and/or control systems of the vehicle to improve safe operation of the vehicle and/or aid in lane keep tracking.

Cameras can be used in LKA systems to detect lane-markings. However, adverse weather conditions, such as heavy-rain, fog, or snow, may deteriorate an ability of the optical sensors to accurately detect the lane-markings. Further, road markings covered with ground water, snow, or mud, may also affect visibility for the optical sensors.

Global navigation satellite system (GNSS) receivers and inertial measurement units (IMU) may be used in localization systems to determine a vehicle's location. However, position accuracy may be relatively low due to insufficient number of visible satellites or multi-path reflections of signals from the satellites.

Other localization approaches may adopt 3D light detection and ranging (lidar) to observe the surrounding environment and match the observation with a priori known 3D point cloud map to estimate a position of the vehicle within the map. However, gathering, processing, and storing 3D point cloud data may require immense storage and on-board processing on the vehicle or, if stored on servers, makes the simultaneous downloading/using of the 3D point cloud map and 3D point cloud another challenge. Further, lidar sensor detection methods also rely on optical sensors that may have limitations in visibility due to fog, heavy-rain and lane markings covered with snow, ground water, mud, etc.

In some cases, the systems and methods of the disclosure may use radar for lane detection. For instance, the lane or curb markings may include metallic particles (e.g., flecks, flakes, or pigment) in paint of the lane or curb markings. The radar may detect markings by radar signature and determine range and azimuth angle of the markings to determine lane keeping state with respect to lanes or curbs of an environment. In this manner, a localization system can determine relative or absolute position of a vehicle or change thereof, even in adverse weather conditions that may affect optical systems, such as cameras or lidar.

In some cases, the systems and methods of the disclosure may use radar to detect the markings by radar signature and extract lane or curb features from radar data associated with a radar image (e.g., extract shape, position, and/or orientation of lane and/or curb markings from radar points within a 3D radar map). The system may match the extracted lane or curb features to features of a (semantic) map to determine an estimate of a position of the vehicle. Moreover, the matched position may be used to fuse with estimated position of GNSS or real-time kinematic (RTK) information receivers, to determine a current location of a vehicle.

Benefits of the present disclosure may be that radar is less sensitive to adverse weather, and the lane markings can be detectable by the radar. For instance, radar may be unaffected by day and night ambient light conditions unlike optical sensors of cameras or lidar. Further, radar may be less sensitive to adverse weather conditions, such as fog, rain, or snow. Moreover, radar may be longer range and wider azimuth angle with no wide-angle distortion, as compared to optical sensors of cameras or lidar. Also, radar may detect the markings while covered with snow, mud and floodwater. Therefore, accurate localization of the vehicle (within a lane and generally on a map) using a radar may help to control the unintended lane drift of an autonomous vehicle and to determine a precise real-time location of the autonomous vehicle.

By virtue of the implementation of systems, methods, and computer program products described herein, an autonomous vehicle or AV system can use a radar to determine location with respect to a lane or map using metallic markings. Therefore, systems of the present disclosure may overcome certain limitations of optical sensors of cameras or lidar and provide operational data to ensure safer operational actions.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
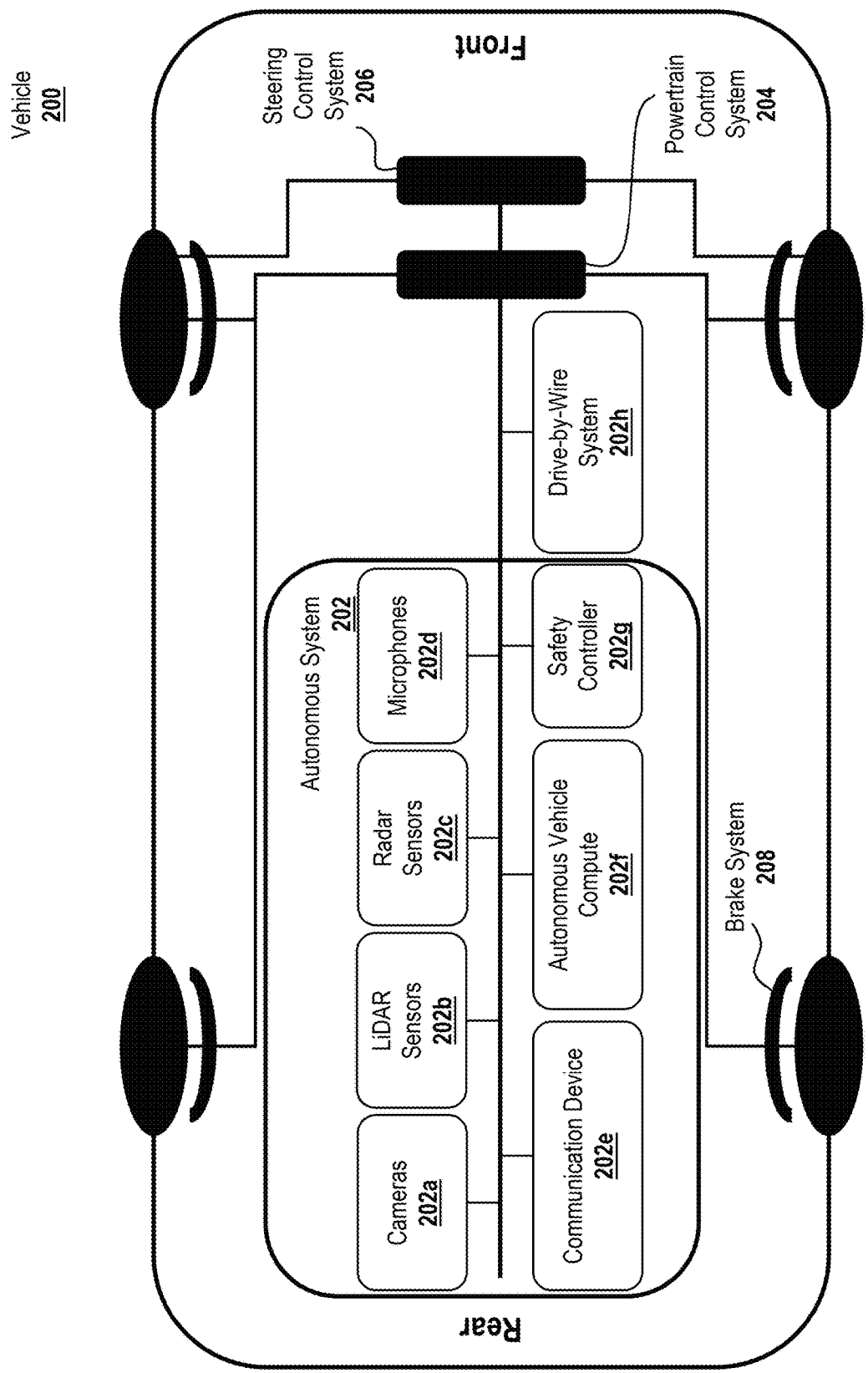
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
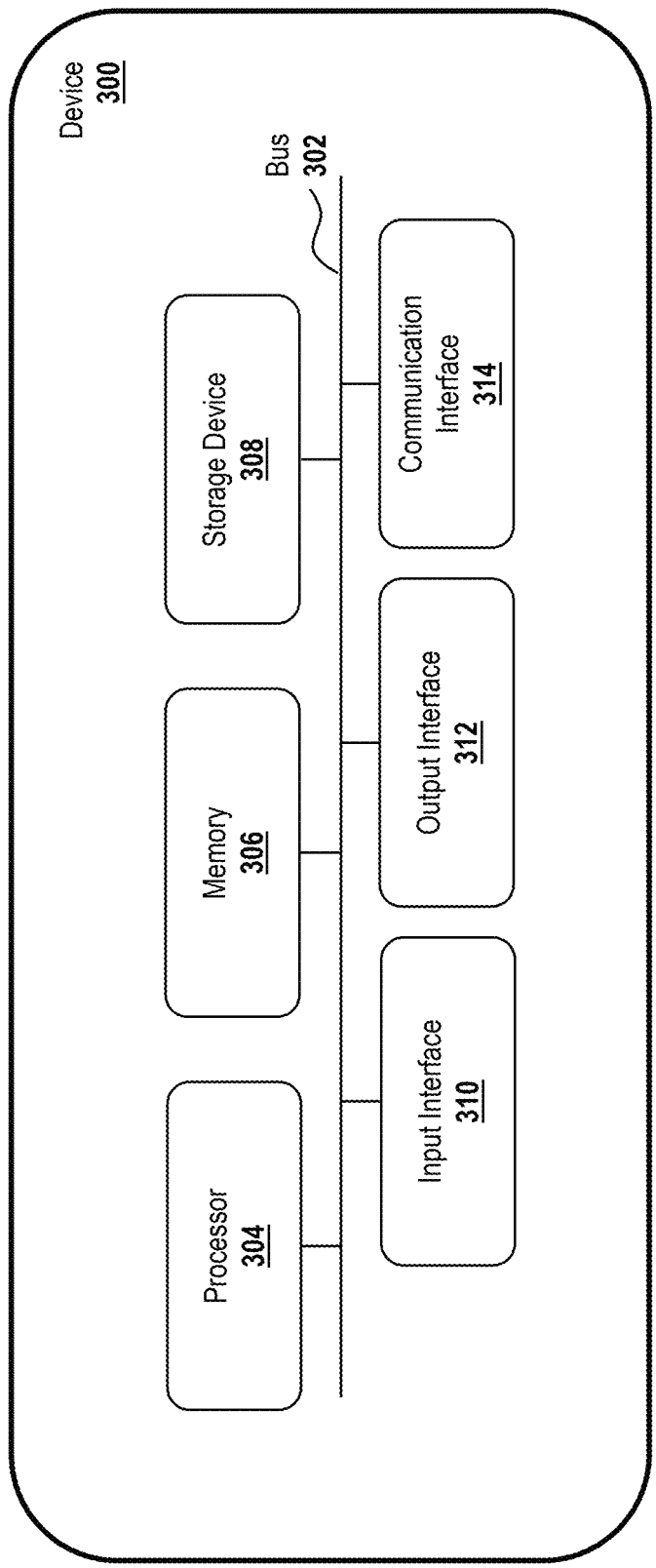
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data (TLD data) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LIDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Figure 4A:
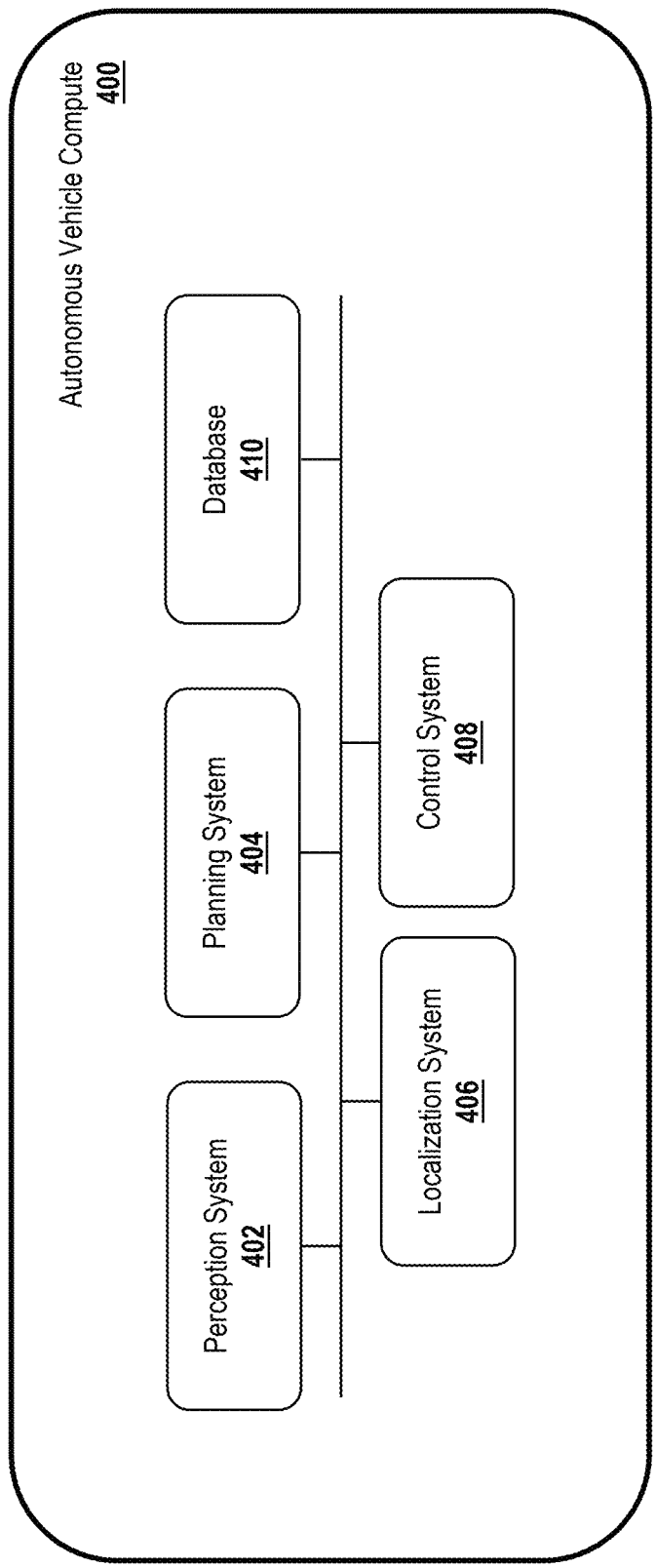
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
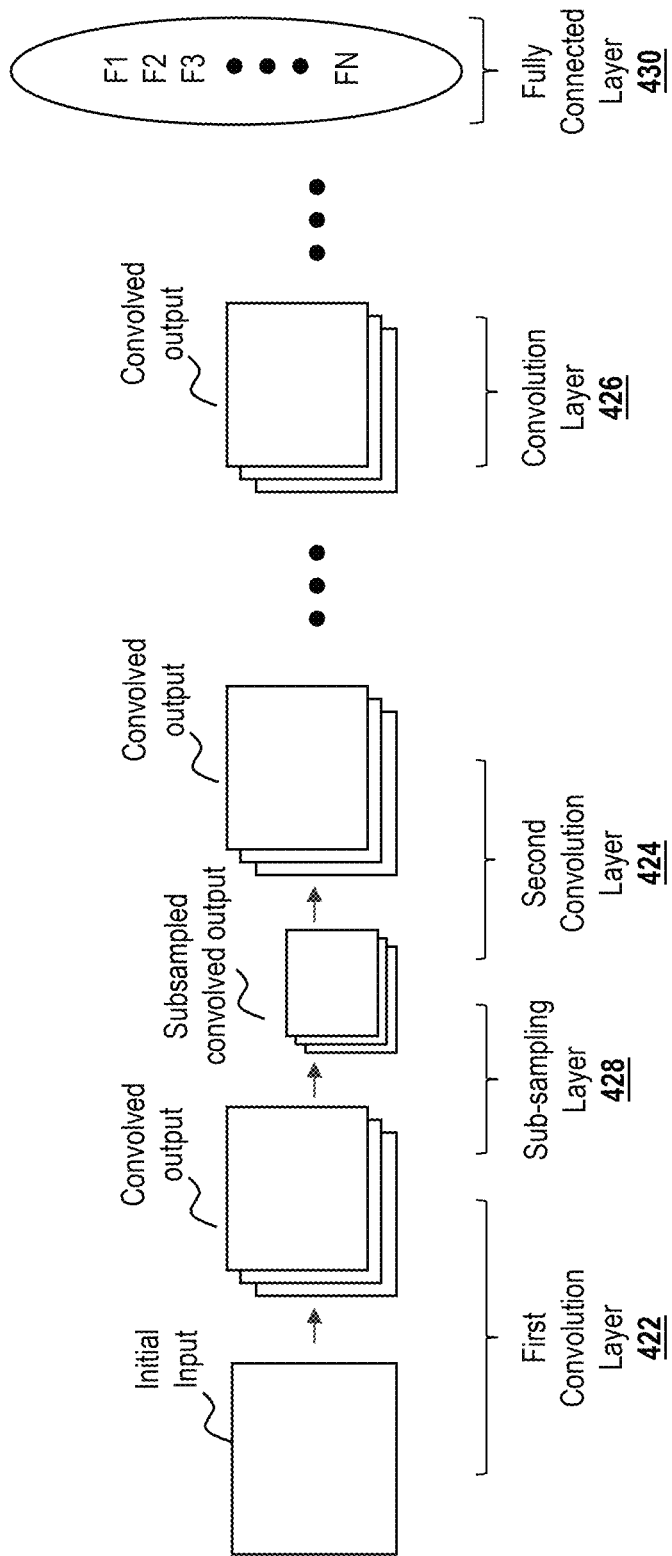
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
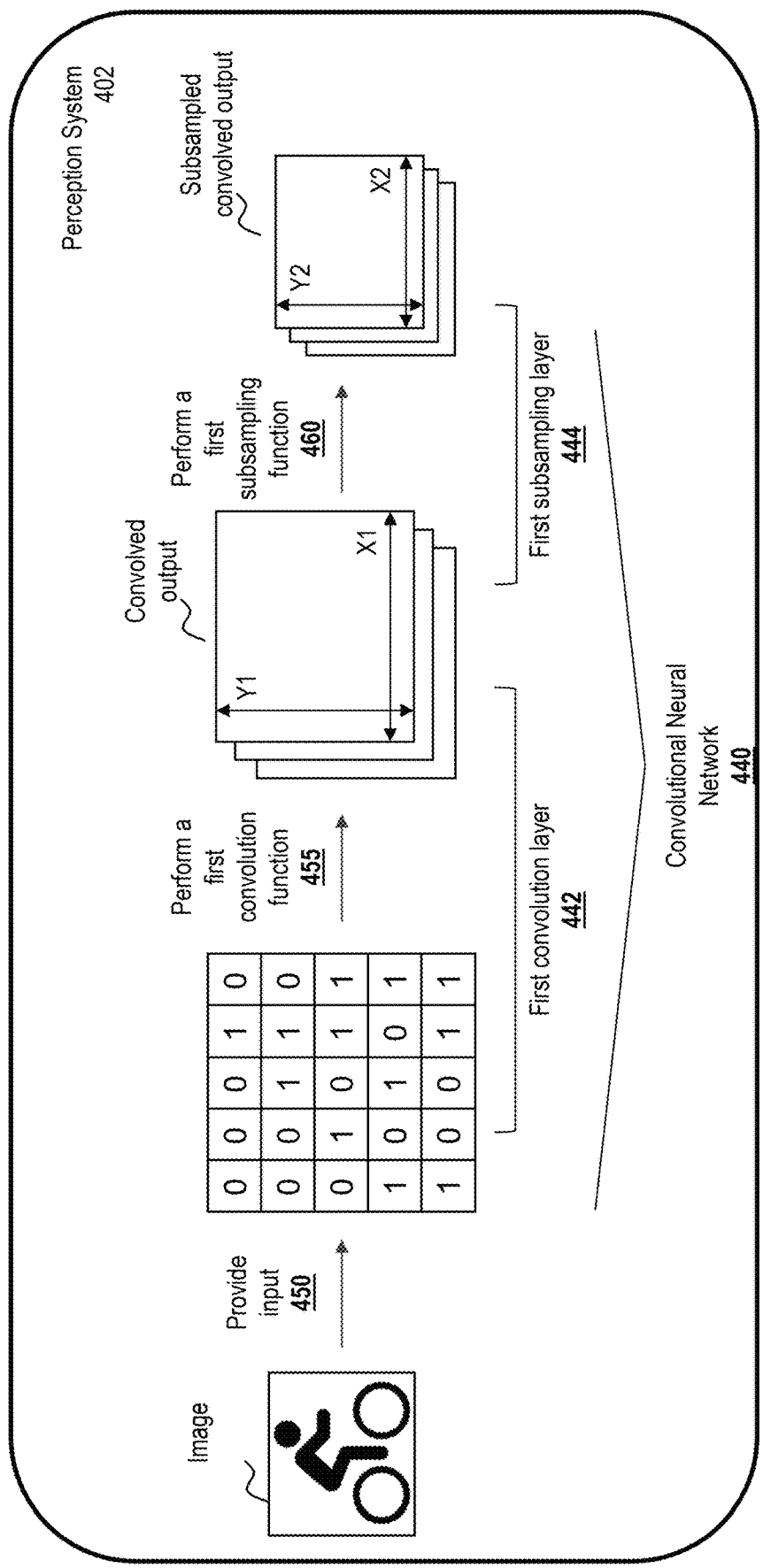
FIGS. 4C and 4D are a diagram illustrating example operation of a CNN.
Figure 4D:
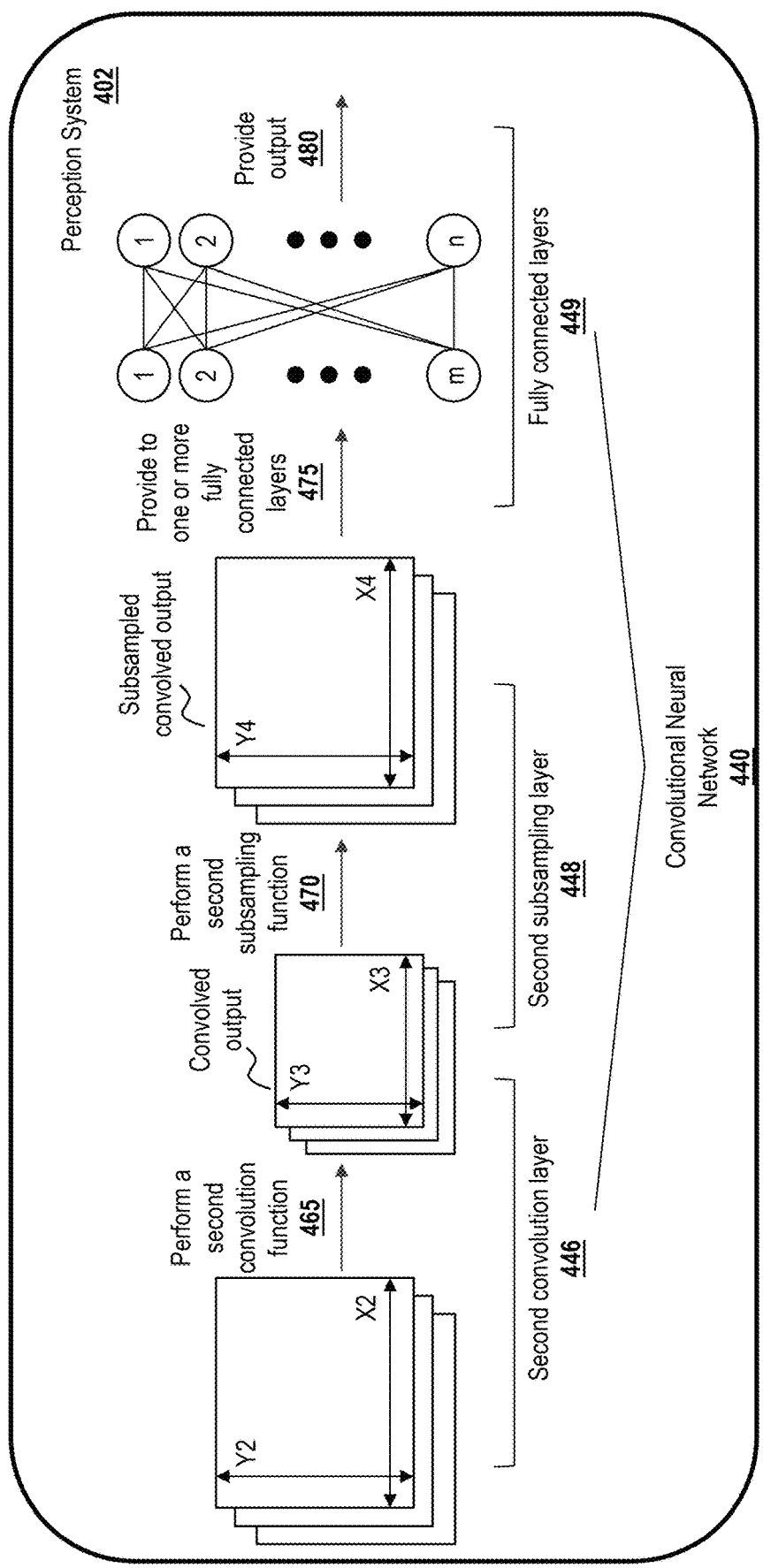

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Localization System Using RADAR and Lane or Curb Markings

Figure 5A:
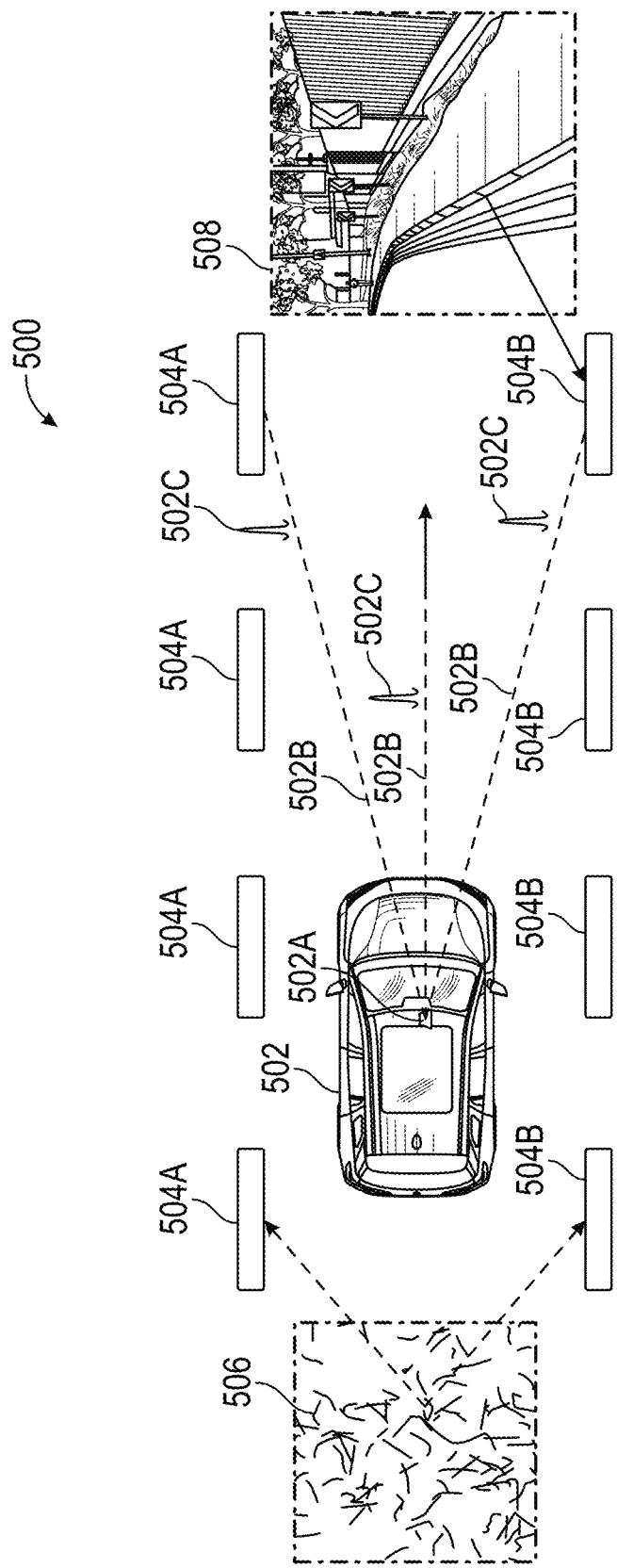
FIG. 5A is a diagram illustrating an example lane and/or curb sensing environment, according to embodiments of the present disclosure.

FIG. 5A is a diagram illustrating an example lane and/or curb sensing environment 500, according to embodiments of the present disclosure. FIG. 5A also includes an image 508 of the environment 500 and an image of metallic particles 506 in markings 504 in the environment 500.

In the illustrated example, the environment 500 includes vehicle 502 operating therein, various road markings, including lane markings 504A or curb markings 504B (individually or collectively "markings 504"). The vehicle 502 can be similar to and/or include any one or any combination of the components described herein with reference to vehicle 200.

Lane markings 504A may be paint markings indicating an edge of a lane of a road between separate lanes of the road. Curb markings 504B may be paint markings indicating an edge of a lane of a road associated with a physical barrier (e.g., curb, barrier, etc.) as an outside area of a road or a separation between, e.g., portions of the road (e.g., opposite directions, diverging portions in a same direction). The markings 504 may have metallic particles 506.

As described herein at least with reference to FIG. 2, the vehicle 502 may cause a radar sensor 502A (similar to radar sensors 202c) to transmit radio waves 502B into the environment 500 and receive return radio waves 502C from the environment 500.

As described herein, the markings 504 (and/or the paint of the markings 504) may include the metallic particles 506, such as metallic flecks or flakes. In some cases, paint of the markings can include a metallic pigment. In certain cases, a composition of the markings 504 may be defined so as to create a radar signature in response to radio waves of a given wavelength. For instance, the given wavelength may correspond to an output wavelength of an automotive radar to improve the detectability of the markings 504 by the radar 502A. For instance, a size of flecks/flakes or pigment and density thereof may be used to enhance the reflection of the markings 504 for radar frequencies of the radar 502A.

In certain cases, the transmitted radio waves 502B may be phase coded to indicate a position or time of transmission. In this manner, the radar 502A may analyze any return radio waves 502C to determine ranges and azimuth angles of the return radio waves 502C. The transmitted radio waves 502B may have a wavelength that is longer than lidar. In this manner, the transmitted radio waves 502B may not be interfered with by environmental circumstances, whereas optical signals of cameras or lidar may be blocked by such environmental circumstances.

The vehicle 502 (e.g., radar 502A or perception system 402) may determine whether radar points of a radar image (based on returned radio waves 502C) have a radar signature indicating markings 504. The radar signature may indicate a marking 504 based on an intensities of the radar points for returned radio waves 502C and/or ranges of the radar points for returned radio waves 502C. For instance, if the intensities and/or ranges of the radar points for returned radio waves 502C satisfy a signature condition (e.g., referred to as "matching" a signature), the radar points for returned radio waves 502C may be determined to indicate a marking 504. In some cases, the signature condition may include a first condition and/or a second condition. The first condition may be a minimum intensity, a maximum intensity, or a range of intensity, based on, e.g., the composition of the markings 504 for an intensity of a returned radio wave, where the minimum, maximum, or range may be adjusted based on a range of the radar point of the returned radio wave 502C. For instance, the minimum, maximum, or range of intensity may be inversely proportional to the range of the radar point of the returned radio wave 502C (e.g., due to attenuation). The second condition may be a shape condition and/or a density condition. The shape condition may be satisfied if positions (indicated by ranges and azimuth angles) of radar points of returned radio waves match one or more defined shapes. The density condition may be satisfied if the positions of the radar points of the returned radio waves are close enough to each other to have a number of positions per unit volume greater than a minimum number of positions per unit volume.

The vehicle 502 (e.g., radar 502A or perception system 402) may determine positions of markings 504 based on certain ranges and azimuth angles of radar points of the returned radio waves 502C that satisfy the signature condition. For instance, the localization system 406 may determine a state of the vehicle relative to the markings 504. The state of the vehicle relative to the markings 504 can include, but is not limited to, an absolute location of the markings with respect to the vehicle (if a current location of vehicle 502 is determined (e.g. in parallel using localization/GNSS)), rates of change thereof (e.g., rate of change of relative location or rate of change of absolute location), orientation of vehicle 502 (parallel to, heading towards or away from) with respect to the markings 504 (e.g., as a vehicle changes orientation in 3D space), vehicle velocity relative to the markings 504, etc. In some cases, different state of the vehicle 502 with respect to the detected markings 504 may be determined over time as each state is detected using radio waves of the radar 502A. The vehicle 502 (e.g., radar 502A or perception system 402) may store data associated with detected markings 504 (such as intensity, position (relative or absolute), rate of change thereof (over time between sensing instances), orientation, time of detection, position of vehicle 502 at time of detection, range, and/or azimuth angle of returned radio wave 502C). The vehicle 502 (e.g., radar 502A or perception system 402) may store the data associated with detected lane markings 504 in various ways. For instance, the vehicle 502 may store the data in a data structure (e.g., first-in first-out, for a given period of time, etc.). In some embodiments, the data associated with detected lane markings may be stored as a 3D point cloud, which may be cross-referenced to a geographic or semantic map related to the vehicle 502.

In some embodiments, the localization system 406 may transmit the state to the control system 408 or planning system 404. The control system 408 or planning system 404 may perform a first or second lane keep action in accordance with the state of the vehicle with respect to a lane (as indicated by the detected markings 504).

In some embodiments, the localization system 406 may extract at least one lane or curb feature based on the detected lane markings 504, and determine the location of the vehicle based on the at least one lane or curb feature. The localization system 406 may then transmit the location of the vehicle to the planning system 404 or the control system 408. The planning system 404 may then perform route planning or the control system 408 may control the vehicle, based on the determined location of the vehicle.

For instance, to determine the portion of the radar image that includes the lane or curb markings, the localization system 406 may: determine whether a set of radar points of the radar image satisfies the signature condition. If any set of radar points of the radar image satisfy the signature condition, the set of radar points of the radar image that satisfy the signature condition may be labeled or extracted as the portion of the radar image that includes the lane markings 504A or curb markings 504B. If no set of the radar points satisfy the signature condition, no markings 504 may be detected and the radar image may be labeled as including zero markings 504.

In some cases, such as when a lane keep assist process is being executed, the location of the vehicle can be a relative location of the vehicle with respect to a lane associated with the lane or curb markings. In certain cases, such as when a localization process is being executed, the location of the vehicle can be a geographic location or relative location of the vehicle with respect to an origin of a map. For instance, the localization system 406 may determine a location based on extracted features matched to known features from a map, such as a semantic map (e.g., map with annotated features of a roadway or an environment, such as radar images of the roadway or environment). In cases where both the lane keep assist process and the localization process are being executed, the localization system 406 can determine a first location and a second location based at least in part on the determined portion of the radar image that includes the lane or curb markings. The first location may be a relative location of the vehicle with respect to a lane associated with the lane or curb markings. The second location may be a geographic location or a relative location of the vehicle with respect to the origin of the map.

Moreover, in some cases, when executing the lane keep assist process, the localization system 406 may determine the state of the vehicle (including, e.g., the relative location) with respect to a lane associated with the lane or curb markings, as discussed above. The localization system 406 may transmit the state to the control system 408 or the planning system 404, which may cause the vehicle to move relative to the lane based on the determined state of the vehicle. For instance, if the vehicle is approaching an edge of the lane (e.g., within a threshold distance, at/within threshold orientation, over time, etc.), the vehicle may be directed away from the edge (e.g., by adjusting a planned path, or by adjusting a control signal to change direction or speed). Generally, this may be referred to as a first lane keep action (e.g., to keep the vehicle in the lane based on the state). If the vehicle is not approaching an edge (e.g., not within the threshold distance, not at/within the threshold orientation, over time, etc.), the vehicle may be directed to maintain course (e.g., by maintaining the planned path, or by maintaining a control signal). Generally, this may be referred to as a second lane keep action (e.g., not perform an adjustment, to keep the vehicle in the lane). As mentioned above, the state of the vehicle with respect to the lane may be determined based on ranges and azimuth angles of corresponding lane or curb markings based on the portion of the radar image that includes the lane or curb markings. For instance, by determining which radar points of returned radio waves indicate markings 504 and determining their relative position over time with respect to the vehicle 502A, the localization system 406 may determine the state of the vehicle with respect to the detected markings 504 based on the determined ranges and azimuth angles of the corresponding lane markings. As described herein, the state of the vehicle with respect to the detected markings 504 may include at least one of: a location of the vehicle in the lane, an orientation of the vehicle to the lane, a rate of change of the location of the vehicle in the lane, a rate of change of the orientation of the vehicle to the lane, a velocity of the vehicle, etc.

Moreover, in some embodiments, when executing the localization process, the localization system 406 may extract at least one lane or curb feature based on at least the portion of the radar image that includes the lane 504A or curb markings 504B, and determine the location of the vehicle based on the at least one lane or curb feature. In some cases, to extract at least one lane or curb feature based on at least the portion of the radar image that includes the lane 504A or curb markings 504B, the localization system 406 may determine shapes and/or sizes of the markings 504B. In certain cases, the localization system 406 may use a machine learning system to extract at least one lane or curb feature.

In some cases, to extract at least one lane or curb feature, the localization system 504B may determine a three-dimensional shape (3D shape) of the lane markings 504A or curb markings 504B based on the portion of the radar image that includes the lane markings 504A or curb markings 504B. For instance, the localization system 504B may determine certain radar points of the radar image (that corresponds to a 3D radar point cloud) are within a threshold distance of each other and form a single 3D shape. The localization system 504B may then extract the at least one lane or curb feature from the 3D shape (e.g., by selecting the certain points of the 3D point cloud). In some cases, the localization system 504B can determine the 3D shape by, e.g., grouping two or more lane markings 504A or curb markings 504B.

In some cases, to use a machine learning system to extract the at least one lane or curb feature, the localization system 406 may communicate the portion of the radar image to a trained first machine learning system; and receive the at least one lane or curb feature from the first machine learning system. The trained first machine learning system may include a trained first neural network trained to extract lane or curb features from radar images. For instance, the portion of the radar image (or the entire radar image) may be formatted as a feature vector to be input to the neural network, and the neural network may be trained to detect 3D shapes based on radar points of the 3D radar point cloud.

In some cases, the localization system may determine the location of the vehicle based on the at least one lane or curb feature by obtaining a digital map (e.g., semantic map), determining a matching feature of the digital map to the at least one lane or curb feature, obtaining a match location for the matching feature, determining a transformation from the match location to a location of the vehicle based on at least the radar image, and determining the location of the vehicle based on the match location and the transformation.

To obtain the digital map, the localization system 406 may cross-reference a most recently known location (e.g., with a known confidence level) with a data store of maps (e.g., indexed based on location), and retrieve a digital map for a corresponding area. The digital map may be for a geographic area (e.g., city, state, geographic sub-division, or geographic portion thereof, etc.). Generally, the digital map may indicate roads, fixed obstacles, etc. and, in relevant part, lane markings or curb markings of the area. The digital map may include at least 3D radar point cloud data and/or 3D lidar point cloud data for lanes markings or curb markings in the geographic area. For instance, in some embodiments, the digital map may include lane markings or curb markings from 3D lidar point cloud data for the geographic area. In this case, the transmission, storage, or processing requirements to match against 3D lidar data with 3D radar point clouds may be reduced versus using full-scale 3D lidar point cloud data with 3D lidar point clouds, thereby reducing transmission, storage, and processing requirements. Moreover, as the target 3D lidar point cloud has less data because it only represents lane markings or curb makings, the transmission storage, and processing requirements are reduced. Additionally or alternatively, the 3D radar point cloud data may be used as (generally) the dispersion of points (e.g., a resolution) may be sufficient for localization of lanes/markings, but avoid additional transmission, storage, and processing requirements for higher resolution solutions. The 3D radar point clouds and/or the 3D lidar point clouds may be gathered, processed, and prepared for run-time execution by various methods (e.g., mapping vehicles).

To determine the matching feature of the digital map, the localization system 406 can compare the extracted lane and/or curb feature with features from the digital map. In certain cases, the localization system can identify a matching feature using machine learning system. In certain cases, to determine whether any features of the digital map match the at least one lane or curb feature, the localization system 406 may determine whether the extracted 3D shape of the at least one lane or curb feature satisfies a match condition of any feature of the digital map. For instance, the match condition may be satisfied when certain groups of points of the 3D radar point cloud of 3D shapes (corresponding to the lane of curb feature) are within a threshold similarity (e.g., as a group) to a 3D shape (identified as a lane and/or curb) of the digital map. If so, the localization system 406 may determine a match; if not, the localization system 406 may determine no matches.

In certain cases, to use a machine learning system to identify matching features of the digital map to the at least one lane or curb feature, the localization system 406 may communicate the extracted at least one lane or curb feature to a trained second machine learning system; and receive (if any) matching features of the digital map. The trained second machine learning system may include a trained second neural network trained to determine matches between input features and an input digital map. For instance, the extracted at least one lane or curb feature and the digital map may be formatted as a feature vector to be input to the neural network, and the neural network may be trained to determine whether any portion of the digital map matches the at least one lane or curb feature. It will be understood that the first and second machine learning systems (or neural networks) described herein may be combined into a single machine learning system or neural network. For ease of reference, the separate functional components have been discussed in separate portions of the disclosure.

If the matching condition and/or second machine learning system indicate a matching feature in the digital map, the localization system 406 may obtain the match location for the matching feature. In some cases, to obtain the match location for the matching feature, the localization system 406 may retrieve a stored location for the matched location from the digital map. For instance, the matched location may have an associated location in the digital map. In some cases, the localization system 406 may retrieve the location from a database that stores feature identifiers in associations with locations. For instance, the localization system 406 may determine a feature identifier of a matched feature from the digital map, and use the feature identifier to retrieve a location associated with the matched feature. Alternatively, the second machine learning system may output a location of the feature that matches the lane or curb feature.

Generally, observed locations and features of the digital map may not be aligned/detected at a same location as a vehicle during run-time. In this case, a location of a mapping vehicle (that observed the feature of the digital map) may not be used by the localization system 406 to determine a current location. In this case, the localization system 406 can use a transformation from the match location of the matched feature to the location of the vehicle. To determine the transformation from the match location to the location the vehicle based on at least the radar image, the localization system 406 may determine the transformation based on ranges and/or azimuth angles of corresponding lane or curb markings.

To determine the location of the vehicle based on the match location and the transformation, the localization system 406 may apply the transformation to the match location to determine the location of the vehicle. For instance, the transformation may be a vector from the match location of the matched feature to a location of the vehicle. The vector may be determined based on ranges and/or azimuth angles of corresponding lane or curb markings relative to the vehicle.

Moreover, to determine the location of the vehicle based on the at least one lane or curb feature, the localization system 406 may update a prior known or estimated location of the vehicle 502 using a Kalman filter and the determined location, as described here. In this manner, sensor redundancy and fault tolerance may be strengthened.

Accordingly, systems and method of the present disclosure may cause the radar 502A to output radio waves and receive a radar image from the radar 502A corresponding to returned radio waves. The radar image my include all returned radio waves 502C for a set period of time. The system may then determine whether a portion of the radar image includes lane or curb markings, based on a signature condition. The system may then determine a location of the vehicle based at least in part on the determined portion of the radar image that includes the lane or curb markings. Thereafter (and for each iteration of sensor detection), the vehicle 502 may perform control actions and/or route planning.

Figure 5B:
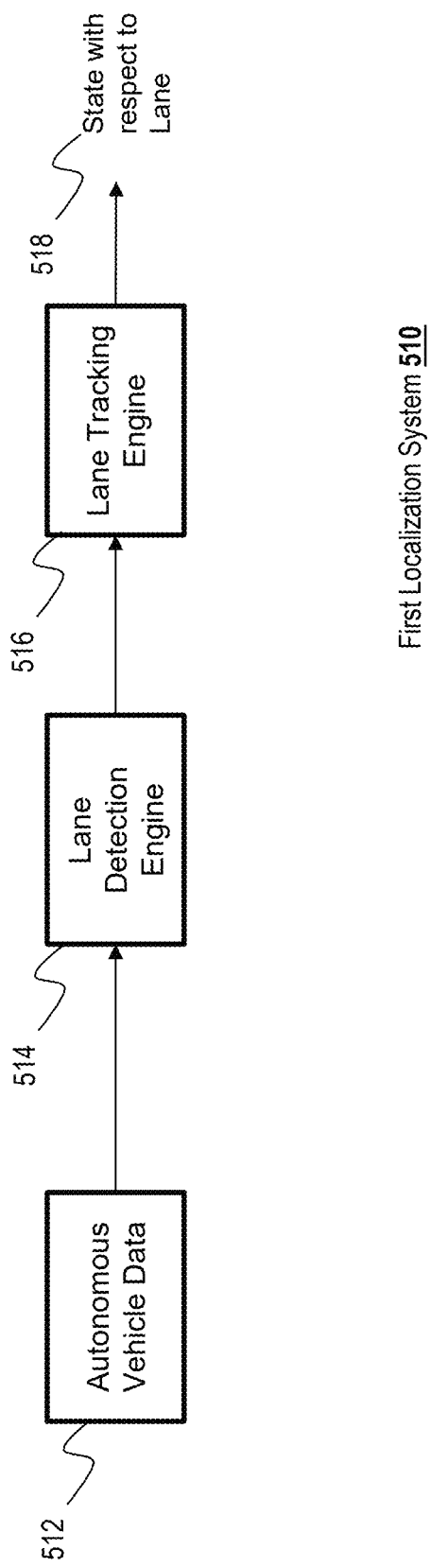
FIG. 5B is an example data flow diagram using a first localization system, according to an embodiment of the present disclosure.

FIG. 5B is an example data flow diagram using a first localization system 510, according to an embodiment of the present disclosure. The first localization system 510 may be a part of the localization system 406. The first localization system 510 may determine a state with respect to lane 518 (as discussed above) based on autonomous vehicle data 512 using a lane detection engine 514 and a lane tracking engine 516. The autonomous vehicle data 512 may include at least a radar image of the radar 502A and/or GNSS data, etc. The lane detection engine 514 may receive the autonomous vehicle data 512 and determine the 3D point cloud of lane markings 504A or curb markings 504B. The lane detection engine 514 may input the 3D point cloud of lane markings 504A or curb markings 504B to the lane tracking engine 516. The lane tracking engine 516 may track and update relative or absolute position (and change thereof) of markings 504 over time, and orientations of vehicle 502 with respect to markings 504 (and changes thereof) over time. In this manner, the state of vehicle 518 with respect to a lane (based on the detected markings 504) may be determined over time as markings 504 are detected by radio waves of the radar 502A based on the radar signatures of lane markings 504. The first localization system 510 may then transmit the state of vehicle 518 to the control system 408 or the planning system 404. The control system 408 or the planning system 404 may perform a lane keep assist process based on the state of the vehicle 518 and perform various actions (e.g., the first lane keep action or second lane keep action).

Figure 5C:
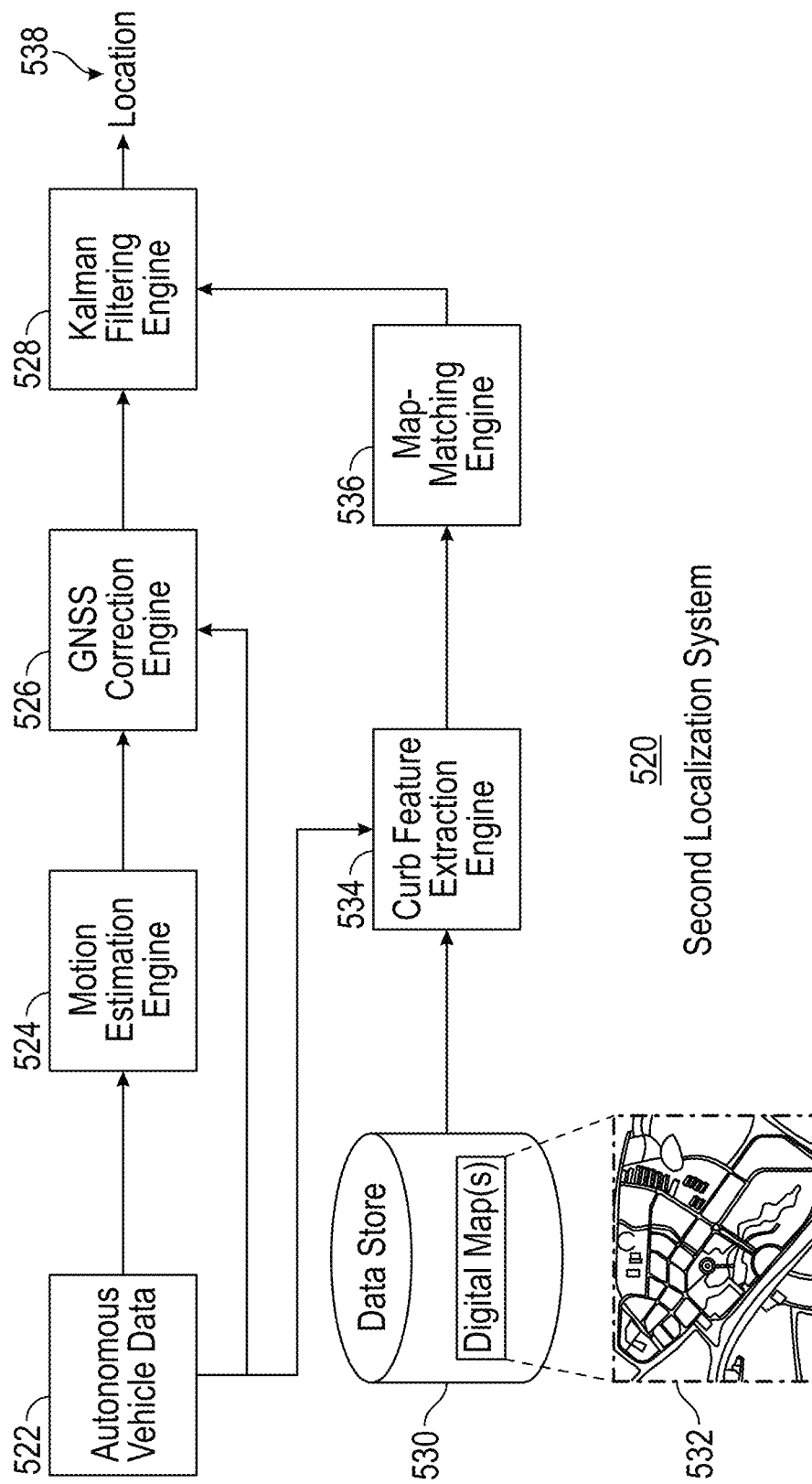
FIG. 5C is an example data flow diagram using a second localization system, according to an embodiment of the present disclosure.

FIG. 5C is an example data flow diagram using a second localization system 520. The second localization system 520 may be a part of the localization system 406. The second localization system 520 may determine a location of a vehicle 538 with respect to an origin of a map (as discussed above) based on autonomous vehicle data 522 using a motion estimation engine 524, a GNSS correction engine 526, a Kalman filtering engine 528, a curb feature extraction engine 534 (using digital maps 532 from a data store 530), and a map-matching engine 536. The autonomous vehicle data 522 may include at least a radar image from the radar 502A, GNSS data, and IMU data, vehicle controls (e.g., throttle or steering controls of the control system 408), etc. The motion estimation engine 524 may estimate changes in position based on, e.g., IMU data, vehicle controls, and other data. The GNSS correction engine 526 may update GNSS data based on the estimate position data, to determine a prior known location. The GNSS correction engine 526 may input the prior known location to the Kalman filtering engine 528.

The curb feature extraction engine 534 may receive the radar image and/or GNSS data. For instance, the curb feature extraction engine 534 may use the GNSS data to select a digital map 532 from the data store 530 based on a most recent location. The curb feature extraction engine 534 may extract the at least one lane or curb feature from the radar image (e.g., based on markings 504 that satisfy the signature condition), as described herein. The map-matching engine 536 may determine a matching feature from the selected digital map 532 to the extracted at least one lane or curb feature, as discussed above.

In the illustrated example, the selected digital map 532 is illustrated as being input to the map-matching engine 536 via the curb feature extraction engine 534. However, it will be understood that that the selected digital map 532 may be input to the map-matching engine 536 without being input to the curb feature extraction engine 534. The map-matching engine 536 may determine a location corresponding to a matching feature from the selected digital map 532 (based on determining a match, e.g., using the matching condition or the second machine learning system). The map-matching engine 536 may input the determined location to the Kalman filtering engine 528, along with the prior known location from the GNSS correction engine 526. The Kalman filtering engine 528 may update the prior known location from the GNSS correction engine 526 based on the determined location from the map-matching engine 536, to determine the location 538.

The second localization system 520 may then transmit the location 538 to the control system 408 or the planning system 404. The control system 408 or the planning system 404 may perform route planning or control based on the determined location 538 of the vehicle 502.

Example Flow Diagram of Classifier system

Figure 6:
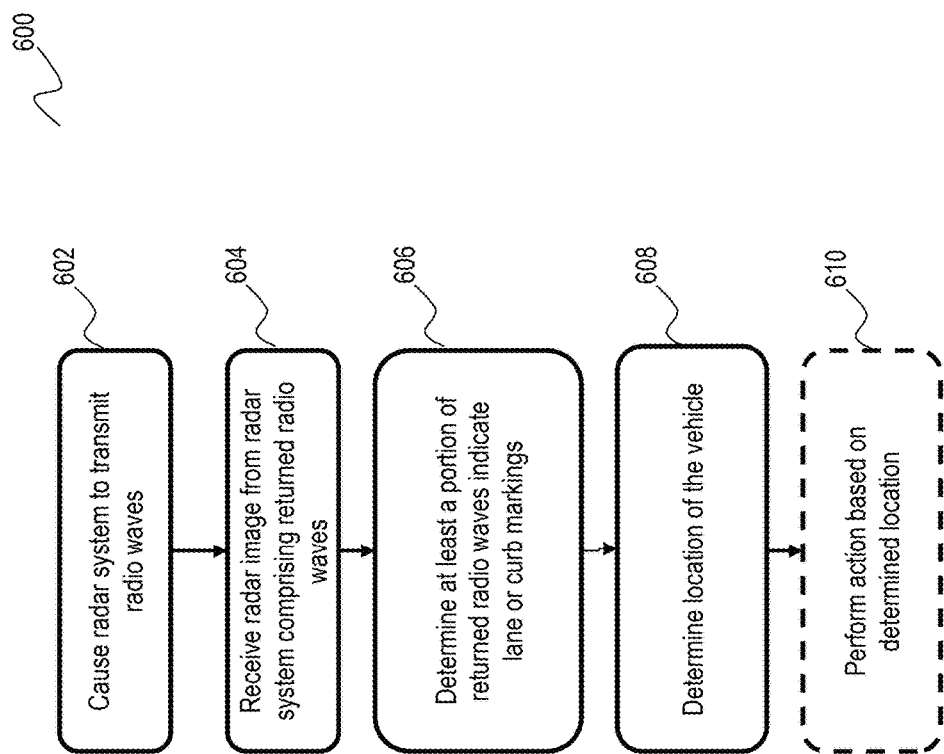
FIG. 6 is a flow diagram illustrating an example of a routine implemented by one or more processors to perform localization.

FIG. 6 is a flow diagram illustrating an example of a routine 600 implemented by one or more processors to determine a location of a vehicle. The flow diagram illustrated in FIG. 6 is provided for illustrative purposes only. It will be understood that one or more of the steps of the routine 600 illustrated in FIG. 6 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 602, the localization system 406 causes a radar system to transmit radio waves. For instance, as described herein, the localization system 406 may periodically (or initially instruct radar 502A to start transmitting) cause the radar 502A to transmit radio waves.

At block 604, the localization system 406 receives a radar image from the radar system. In some cases, the radar system can generate the radar image from radio waves that were emitted by the radar system and reflected off of objects in the environment. As described herein, the radio waves can be phase coded or otherwise marked or annotated to facilitate identification and combination with other radio waves to generate the radar image.

At block 606, the localization system determines that at least a portion of the radar image indicates lane and/or curb markings. As described herein, the lane and/or curb markings can include metallic particles to increase reflectivity, improve the radar system's ability to detect the lane and/or curb markings, and improve the localization system's 406 ability to identify the lane and/or curb markings. For instance, as described herein, the localization system 406 may determine whether radar points of the radar image satisfy a signature condition.

In some cases, the localization system 406 can determine the shape, position, and orientation of the lane and/or curb using the radar points of the radar image. The position and orientation may be determined relative to the vehicle or in 3D or geographic coordinates (e.g., by transforming the ego coordinates for the lane and/or curb to a universal or geographic coordinate system). In certain cases, the localization system 406 can determine the proximity of the lane and/or curb to the vehicle based on the radar points in the radar image. For example, the radar points may have a 3D coordinate assigned to it that represents the location of the radar point relative to the vehicle. Using the 3D coordinates of the radar points associated with the lane and/or curb, the localization system 406 can determine the proximity of the lane and/or curb relative to the vehicle.

At block 608, the localization system 406 determines a location of the vehicle based on the determined lane and/or curb markings. As described herein, the location of the vehicle can be a geographic location or location relative to a map origin and/or a location relative a lane and/or curb (that corresponds to the lane and/or curb marking).

In certain cases, the localization system 406 determines a location of the vehicle relative to the lane and/or curb markings. For example, the radar data associated with the radar image can include location data associated with a location of different radar points. The location data associated with the radar points may be in in a radar coordinate system associated with the radar system and/or the vehicle's ego coordinate system. In some cases, location data in a different coordinate system (e.g., the radar coordinate system) can be transformed into the vehicle's ego coordinate system. Using the location data for the various radar point in the vehicle's ego coordinate system, the localization system 406 can determine the vehicle's location relative to the radar points. These radar points can include radar points that correspond to the lane and/or curb markings. Accordingly, the localization system 406 can determine the vehicle's location relative to the lane and/or curb markings.

In addition to determining the location of the vehicle relative to the lane and/or curb, the localization system 406 can determine a state of the vehicle with respect to the lane and/or curb. The state of the vehicle may include the relative or absolute positions of markings 504 with respect to the vehicle 504, an orientation of the vehicle 502 with respect to the markings 504 (e.g., based on ranges and azimuth angles of the detected markings 504 over time), speed and/or velocity of the vehicle relative to the marking 504, etc.

In some cases, the localization system determines a geographic location (or location relative to a map origin) of the vehicle based on the land and/or curb markings. In certain cases, to determine the geographic location of the vehicle and/or the location of the vehicle relative to an origin of a map, the localization system 406 can extract at least one lane or curb feature. For instance, the localization system 406 can determine a shape and/or size (length, width/depth, height, etc.) of a lane and/or a curb based on the distance between various points in a radar point cloud that are associated with a particular lane and/or curb. The distances can be used to determine the length, width, and/or height of the relevant land and/or curb. In certain cases, the localization system 406 can use a machine learning system to extract the at least one lane or curb feature from the 3D radar point cloud and/or to determine a size and/or shape of a lane and/or curb. The machine learning system can include a trained neural network that has been trained using radar images to detect geometric shapes of lanes and/or curbs from the radar image.

Using the extracted lane and/or curb feature, the localization system 406 can determine a geographic location or location relative to a map origin of the vehicle. For instance, the localization system 406 can compare the extracted lane and/or curb feature with lane and/or curb features from a semantic map to identify a matching feature (e.g., a lane or curb feature from the semantic map that matches or approximates the extracted at least one lane or curb feature). The semantic map can indicate a geographic location of the matching feature. Based on the geographic location of the matching feature, the localization system 406 can determine a geographic location of the vehicle 502. For example, the localization system 406 can determine the relative location of the vehicle 502 to the geographic location of the matching feature based on the radar data associated with the radar image. The localization system 406 can transform the relative location of the vehicle to the matching feature into a universal or geographic coordinate system.

At block 610, the autonomous vehicle compute 400 can use the determined location of the vehicle 504 to perform additional actions. For example, the autonomous vehicle compute 400 (e.g., perception system 402, planning system 404, localization system 406, and/or control system 408) can use the geographic location of the vehicle to identify objects in the environment, navigate paths through the environment, stop, etc.

As another non-limiting example, the autonomous vehicle compute 400 can perform a lane keep action based on the determined state of the vehicle with respect to the lane and/or curb. For instance, the autonomous vehicle compute 400 may determine the vehicle 502 is approaching or within a threshold distance of the lane and/or curb, etc. and perform a corrective maneuver as described herein. As a corollary, if the autonomous vehicle compute 400 determines that the vehicle is not within the threshold distance from the lane and/or curb, the autonomous vehicle compute 400 may not perform a corrective maneuver.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A method, comprising:
   causing a radio detection and ranging (radar) system of a vehicle to output radio waves;
   receiving a first radar image from the radar system corresponding to radio waves detected by the radar system in response to the outputted radio waves;
   identifying a portion of the first radar image that includes a curb and curb markings corresponding to the curb, based on metallic particles embedded within paint on the curb, wherein identifying the portion of the first radar image that includes the curb and the curb markings comprises:
   generating a 3D point cloud from the first radar image based on a plurality of metallic particles within a portion of the paint,
   determining a first 3D shape based on the 3D point cloud, extracting a curb feature from the first 3D shape, wherein the curb feature includes a second 3D shape of at least one curb marking of the curb markings, generating a signature based on the first 3D shape and the curb feature, comparing the generated signature with a plurality of signatures, wherein comparing the generated signature with the plurality of signatures comprises comparing the first 3D shape with a plurality of 3D shapes and the curb feature with a plurality of curb features, and determining, based on the comparing, that the generated signature matches at least one of the plurality of signatures, wherein the at least one of the plurality of signatures corresponds to a second radar image of the curb markings generated based on the metallic particles embedded within the paint on the curb; and determining a location of the vehicle based on the identified portion of the first radar image that includes the curb markings.

2. The method of claim 1, wherein the portion of the first radar image that includes the curb markings comprises a set of radar points of the first radar image.

3. The method of claim 1, wherein the location of the vehicle is a relative location of the vehicle with respect to a curb associated with the curb markings.

4. The method of claim 1, wherein the location of the vehicle is a relative location of the vehicle with respect to an origin of a map.

5. The method of claim 1, wherein determining the location of the vehicle comprises determining a first location and a second location based on the identified portion of the first radar image that includes the curb markings, wherein the first location is a relative location of the vehicle with respect to a curb associated with the curb markings, and wherein the second location is a relative location of the vehicle with respect to an origin of a map.

6. The method of claim 1, wherein determining the location of the vehicle based on the identified portion of the first radar image that includes the curb markings comprises:

determining a state of the vehicle with respect to a curb associated with the curb markings based on the portion of the first radar image that includes the curb markings; and causing the vehicle to move relative to the curb based on the determined state of the vehicle.

7. The method of claim 6, wherein determining the state of the vehicle with respect to the curb comprises:

determining ranges and azimuth angles of corresponding curb markings based on the portion of the first radar image that includes the curb markings, and determining the state of the vehicle based on the determined ranges and azimuth angles of the corresponding curb markings, wherein the state of the vehicle comprises at least one of: a location of the vehicle in a lane, an orientation of the vehicle to the lane, a rate of change of the location of the vehicle in the lane, or a rate of change of the orientation of the vehicle to the lane.

8. The method of claim 1, wherein determining the location of the vehicle based on the identified portion of the first radar image that includes the curb markings comprises:

determining the location of the vehicle based on the curb feature.

9. The method of claim 8, wherein determining the location of the vehicle based on the curb feature comprises:

obtaining a digital map, determining a matching feature of the digital map to the curb feature, obtaining a match location for the matching feature, determining a transformation from the match location based on at least the first radar image, and determining the location of the vehicle based on the match location and the transformation.

10. The method of claim 9, further comprising:

updating a previous or estimated location of the vehicle using a Kalman filter and the determined location of the vehicle.

11. The method of claim 9, wherein the digital map includes at least light detection and ranging (lidar) point cloud data for curbs in a geographic area.

12. The method of claim 1, wherein extracting the curb feature from the first 3D shape comprises:

communicating the portion of the first radar image to a trained machine learning system; and receiving the curb feature from the trained machine learning system.

13. The method of claim 12, wherein the trained machine learning system comprises a trained neural network trained to extract curb features from radar images.

14. A system, comprising:

at least one processor, and at least one non-transitory storage media storing instructions that, when executed by the at least one processor, cause the at least one processor to:

cause a radio detection and ranging (radar) system of a vehicle to output radio waves;

receive a first radar image from the radar system corresponding to radio waves detected by the radar system in response to the outputted radio waves;

identify a portion of the first radar image that includes a curb and curb markings corresponding to the curb, based on metallic particles embedded within paint on the curb, wherein to identify the portion of the first radar image that includes the curb and the curb markings, the instructions further cause the at least one processor to:

generate a 3D point cloud from the first radar image based on a plurality of metallic particles within a portion of the paint, determine a first 3D shape based on the 3D point cloud, extract a curb feature from the first 3D shape, wherein the curb feature includes a second 3D shape of at least one curb marking of the curb markings, generate a signature based on the first 3D shape and the curb feature, compare the generated signature with a plurality of signatures, wherein to compare the generated signature with the plurality of signatures, the instructions, when executed by the at least one processor, further cause the at least one processor to compare the first 3D shape with a plurality of 3D shapes and the curb feature with a plurality of curb features, and determine, based on the comparison of the generated signature with the plurality of signatures, that the generated signature matches at least one of the plurality of signatures, wherein the at least one of the plurality of signatures corresponds to a second radar image of the curb markings generated based on the metallic particles embedded within the paint on the curb; and determine a location of the vehicle based on the identified portion of the first radar image that includes the curb markings.

15. The system of claim 14, wherein the portion of the first radar image that includes the curb markings comprises a set of radar points of the first radar image.

16. The system of claim 14, wherein to determine the location of the vehicle based on the identified portion of the first radar image that includes the curb markings, the instructions further cause the at least one processor to:
  determine a state of the vehicle with respect to a curb associated with the curb markings based on the portion of the first radar image that includes the curb markings; and
  cause the vehicle to move relative to the curb based on the determined state of the vehicle.

17. The system of claim 14, wherein to determine the location of the vehicle based on the identified portion of the first radar image that includes the curb markings, the instructions further cause the at least one processor to:
  determine the location of the vehicle based on the curb feature.

18. The system of claim 17, wherein to determine the location of the vehicle based on the curb feature, the instructions further cause the at least one processor to:
  obtain a digital map,
  determine a matching feature of the digital map to the curb feature,
  obtain a match location for the matching feature,
  determine a transformation from the match location based on at least the first radar image, and
  determine the location of the vehicle based on the match location and the transformation.

19. At least one non-transitory storage media storing instructions that, when executed by at least one processor, cause the at least one processor to:
  cause a radio detection and ranging (radar) system of a vehicle to output radio waves;
  receive a first radar image from the radar system corresponding to radio waves detected by the radar system in response to the outputted radio waves;
  identify a portion of the first radar image that includes a curb and curb markings corresponding to the curb, based on metallic particles embedded within paint on the curb, wherein to identify the portion of the first radar image that includes the curb and the curb markings, the instructions further cause the at least one processor to:
    generate a 3D point cloud from the first radar image based on a plurality of metallic particles within a portion of paint,
    determine a first 3D shape based on the 3D point cloud,
    extract a curb feature from the first 3D shape, wherein the curb feature includes a second 3D shape of at least one curb marking of the curb markings,
    generate a signature based on the first 3D shape and the curb feature,
    compare the generated signature with a plurality of signatures, wherein to compare the generated signature with the plurality of signatures, the instructions, when executed by the at least one processor, further cause the at least one processor to compare the first 3D shape with a plurality of 3D shapes and the curb feature with a plurality of curb features, and
    determine, based on the comparison of the generated signature with the plurality of signatures, that the generated signature matches at least one of the plurality of signatures, wherein the at least one of the plurality of signatures corresponds to a second radar image of the curb markings generated based on the metallic particles embedded within the paint on the curb; and
  determine a location of the vehicle based on the identified portion of the first radar image that includes the curb markings.

20. The at least one non-transitory storage media of claim 19, wherein the portion of the first radar image that includes the curb markings comprises a set of radar points of the first radar image.

* * * * *